(12) United States Patent
Park

(10) Patent No.: US 7,761,688 B1
(45) Date of Patent: Jul. 20, 2010

(54) MULTIPLE THREAD IN-ORDER ISSUE IN-ORDER COMPLETION DSP AND MICRO-CONTROLLER

(75) Inventor: Heonchul Park, Cupertino, CA (US)

(73) Assignee: Redpine Signals, Inc., San Jose, CA (US)

( * ) Notice: Subject to any disclaimer, the term of this patent is extended or adjusted under 35 U.S.C. 154(b) by 489 days.

(21) Appl. No.: 11/899,557

(22) Filed: Sep. 6, 2007

Related U.S. Application Data

(63) Continuation of application No. 10/727,190, filed on Dec. 3, 2003, now abandoned.

(51) Int. Cl.
*G06F 9/00* (2006.01)
(52) U.S. Cl. ........................ 712/200; 712/214
(58) Field of Classification Search ................. 712/200, 712/214
See application file for complete search history.

(56) References Cited

U.S. PATENT DOCUMENTS 6,341,347 B1 * 1/2002 Joy et al. ..................... 712/228
7,000,233 B2 * 2/2006 Levitan et al. ............... 718/107

\* cited by examiner

*Primary Examiner*—Niketa I Patel
*Assistant Examiner*—Benjamin P Geib
(74) *Attorney, Agent, or Firm*—File-EE-Patents.com; Jay A. Chesavage

(57) ABSTRACT

An in-order issue in-order completion micro-controller comprises a pipeline core comprising in succession a fetch address stage, a program access stage, a decode stage, a first execution stage, a second execution stage, a memory access stage, and a write back stage. The various stages are provided a thread ID such that alternating stages use a first thread ID, and the other stages use a second thread ID. Each stage which requires access to thread ID specific context information uses the thread ID to specify this context information.

40 Claims, 4 Drawing Sheets

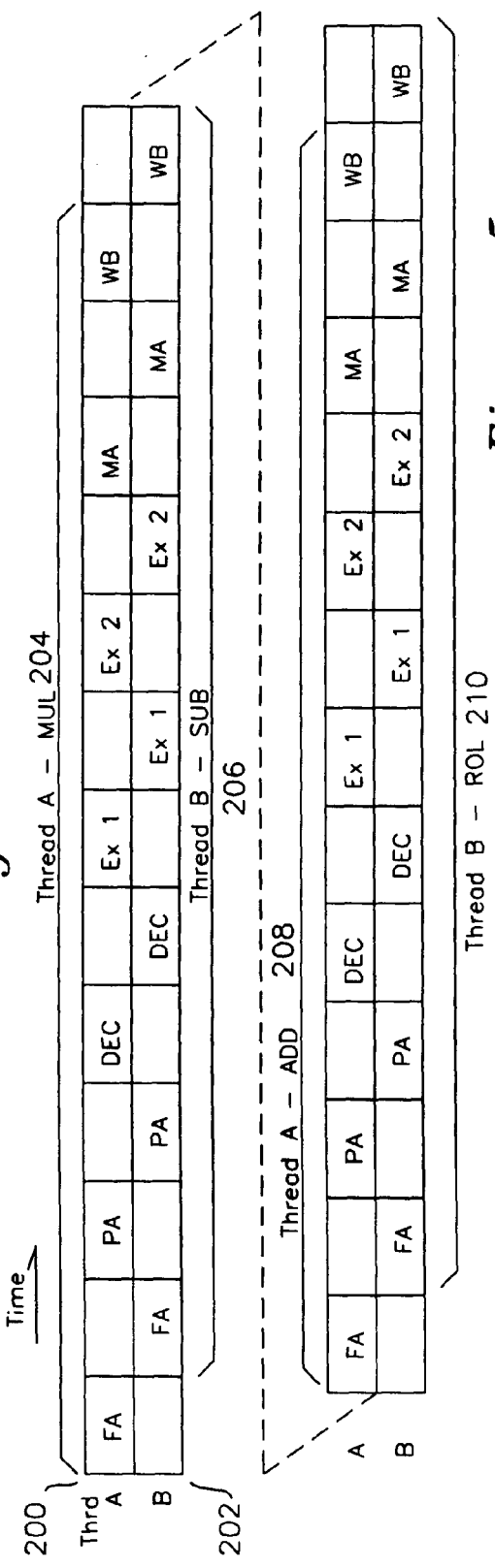

Thread-independant device decodes

Thread-dependant device decodes

MULTIPLE THREAD IN-ORDER ISSUE IN-ORDER COMPLETION DSP AND MICRO-CONTROLLER

This patent application is a continuation of Ser. No. 10/727,190 filed Dec. 3, 2003, now abandoned.

FIELD OF THE INVENTION

The present invention is related to signal processors for use in wireless networks carrying a plurality of wireless sessions. A Digital Signal Processor (DSP) is a type of processor which typically implements an instruction set optimized for mathematical computations, but has limited input-output (IO) capability. A Micro-controller typically has extensive input-output (IO) capability, but limited computational ability. The present invention is an architecture and process for combining these two architectures in a manner best suited for wireless signal processing which typically requires both DSP and micro-controller functionality while handling multiple communications connections.

BACKGROUND OF THE INVENTION

Prior art wireless communication systems are defined in IEEE protocols 802.11 and its various derivatives 802.11a, 802.11b, and 802.11m. In a typical wireless communications system, an RF signal is heterodyned to an intermediate frequency and signal processing occurs to generate a stream of data forming a frame, and a device which performs this processing is known as the physical layer device (PHY) in the OSI layer definitions. The PHY acts as an interface between the RF signal and the stream of unframed data moving to the media access controller (MAC). The media access controller (MAC) layer receives unframed data and separates header information and CRC information to perform data integrity checking, producing a data stream to a host interface, where such data may be moved via a FIFO interface, or into a packet buffer whereby data is held in structures which contain pointers to the next data structure, as is typical for PCI host adapters. In a prior art system, the signal processing from an antenna to the packet memory may be called a wireless host adapter, and each processing stage of the host adapter requires specialized circuitry for the performance of each specific function. If it is desired to allow multiple simultaneous wireless sessions, which requires the user have more than one wireless host adapter, then each host adapter contains its own circuitry, which performs the required PHY and MAC functions independently from any other host adapter. Each host adapter carries one wireless session, and consumes a particular amount of space and power, and each additional host adapter linearly increases the requirement for space and power. Additionally, there are several different protocols for wireless LANs, and other protocols are under development. Presently, each protocol may require its own host adapter which operates for that particular protocol only.

In a wireless communications system, there are often two types of processors used: a micro-controller for handling data movement to and from a host adapter memory, and a DSP to handle signal processing calculations done on incoming signals. Compared to prior art uses of micro-controllers and DSPs, the bandwidths involved in wireless communications are lower, however most modern micro-controllers and DSPs have a surplus of bandwidth available, which translates into higher power dissipation. The higher power dissipation and inseparability of the DSP function and IO function results in both types of processors being used in a typical systems, which also contributes to higher power dissipation and shorter battery.

In addition to the need for a hybrid DSP and micro-controller, there is also the need to be able to separate processing of two channels into fixed-bandwidth processing threads. In the current art of multi-tasking real-time operating systems, multiple instances of a program are executed using separate storage contexts and a Real-Time Operating System (RTOS) which allocates a certain amount of time to each task. The overhead of an RTOS is fairly high, and context switching from one task to another takes hundreds to thousands of processor clock cycles. Because of the high overhead of context switching and the requirement of guaranteed processing bandwidth in a digital signal processor, real-time operating systems with task switching are not implemented in current DSP processors, since the processing needs to be done in something much closer to real-time and without one task blocking the others. Currently, RTOS task switching is accomplished by buffering data after the task of interest is switched out of context, which means switching to an inactive state either in memory or some form of storage for recovery when the task is switched back in context at some time in the future. For this reason, a typical DSP is typically a single context performing computations, and a micro-controller handling IO uses an RTOS, and does task switching.

It is desired to enable a finer grained context switching which is optimized for the needs of a small plurality of channels of wireless communications links. Each of these links requires processing tasks of performing DSP calculations on incoming data and moving data from one network layer to the next.

FIG. 1 shows a prior art pipelined processor 10. Each stage performs an operation in a single stage clock cycle, although the clocks within a single stage may operate at higher rates than the stage clock. The stages are separated by registered boundaries shown as dashed lines, such that anything crossing a dashed line in FIG. 1 is fed through a clocked register such as a D flip flop on each clock cycle. As known to one skilled in the art, data is generally available from one stage to the next on each clock cycle, unless a condition known as "stall" occurs. In a stall condition, for example when accessing slow external memory 42, the entire pipeline receives a stall signal 46 and remains in this state until data becomes available from external memory before resuming movement of data across stage boundaries. The interval of time spent waiting for external memory to become available is known as "pipeline stall time". When a pipeline stall condition occurs, all data processing comes to a halt until the stall condition is cleared, as indicated by the stall indicator signal 42.

In the prior art processor 10 of FIG. 1, a program counter 12 provides a memory address to a Fetch Address Stage 14, which passes along the address to a Program Memory 18 via an address buss 16. A data buss 20 returns the program data on the next stage clock to the Program Access Stage 22. The Decode stage 28 separates the data returned from program access 22 into opcodes and data, where the opcode comprises a specific instruction to perform a particular operation using either registers 24, immediate data associated with the opcode, or data memory 40. The Decode stage 28 may determine that a data value accompanying the opcode is to be loaded into a particular register location 24, or the contents of a particular register is to be rotated, etc. The decoded operation is passed to a first execution stage EX1, which may include some multiplier operations, and to a second execution stage EX2, which contains an arithmetic logic unit (ALU) 36 for performing arithmetic operations such as add, subtract, rotate, and other functions known to one in the art of processor design. Data memory 40 which is to be written or read is accessed by providing an address, and the returned data is recovered by memory access stage 38. Memory Access stage 38 is also responsible for reading and writing external shared memory, which is typically much slower than data memory 40 or register memory 26. The Write Back stage 44 writes data back to the register controller 26.

The prior art processor of FIG. 1 performs many functions well. However, any stall condition which may occur, for example, when data is read from external memory 42, causes stoppage of the entire data path through assertion of the Stall signal 46 which indicates to all pipeline stages to stop forwarding information until the stall condition is cleared. For time-sensitive calculations, this stall condition can be catastrophic. It is desired to provide an architecture which allows more than one thread to simultaneously proceed through the core pipeline during a stall condition.

OBJECTS OF THE INVENTION

A first object of the invention is a fine grained context switching processor.

A second object of the invention is a fine grained multi-threaded processor which includes context storage for a Program Counter and a plurality of Registers.

A third object of the invention is a fine grained multi-threaded processor which includes several stages of functionality separated by registered boundaries, such that alternating stages have access to Storage Registers, and the same set of alternating stages is using the same thread ID so that register operations for a single thread may be performed simultaneously.

A fourth object of the invention is a fine grained multi-threaded processor which includes several pipeline stages, each stage having access to a thread ID.

A fifth object of the invention is a fine grained multi-threaded processor which includes several pipeline stages, each stage separated from the other by a registered boundary, and an n-way register controller which simultaneously writes data from multiple stages into a common set of registers for a particular thread ID.

SUMMARY OF THE INVENTION

A processor includes a plurality of pipeline stages including a Fetch Address Stage 102 for the generation of program addresses, Program Address generators 106 and 108, a Program Access Stage 104 for receiving data 114 associated with the fetch address 112 instruction, a Decode Stage 120 for decoding multiply instructions from the Program Access into individual operational actions, and passing non-multiply instructions to the ALU, a First Execution Stage (EX1) 126 receiving decoded multiply instructions and performing multiplier operations, and on cycles which are not performing multiplier operations, decoding non-multiply instructions for use by a Second Execution Stage (EX2) which includes an Arithmetic Logical Unit (ALU) sending results to a Memory Access Stage (MA) 134. The Memory Access Stage (MA) 134 reads and writes results from Data Memory 150 or External Memory 152. Data which is intended for Storage Registers is handled by a Write Back to Register Stage 136. Register Storage A 140 and B 142 are controlled by a n-way register controller 138 which enables simultaneous write operations to a plurality of A and B Register locations 140 and 142 during the same stage clock. The blocks which may access the n-way register controller at a single instant in time are the Decode Stage 120, the Second Execution Stage (EX2) 132, and the Write Back to Register Stage 136.

BRIEF DESCRIPTION OF THE DRAWINGS

FIG. 3 shows two threads of program instructions being executed by a single processor.

FIG. 4 shows the instructions of the two threads.

FIG. 5 shows the multi-stage progression of the instructions of FIG. 4 through the processor.

DETAILED DESCRIPTION OF THE INVENTION

Figure 2:
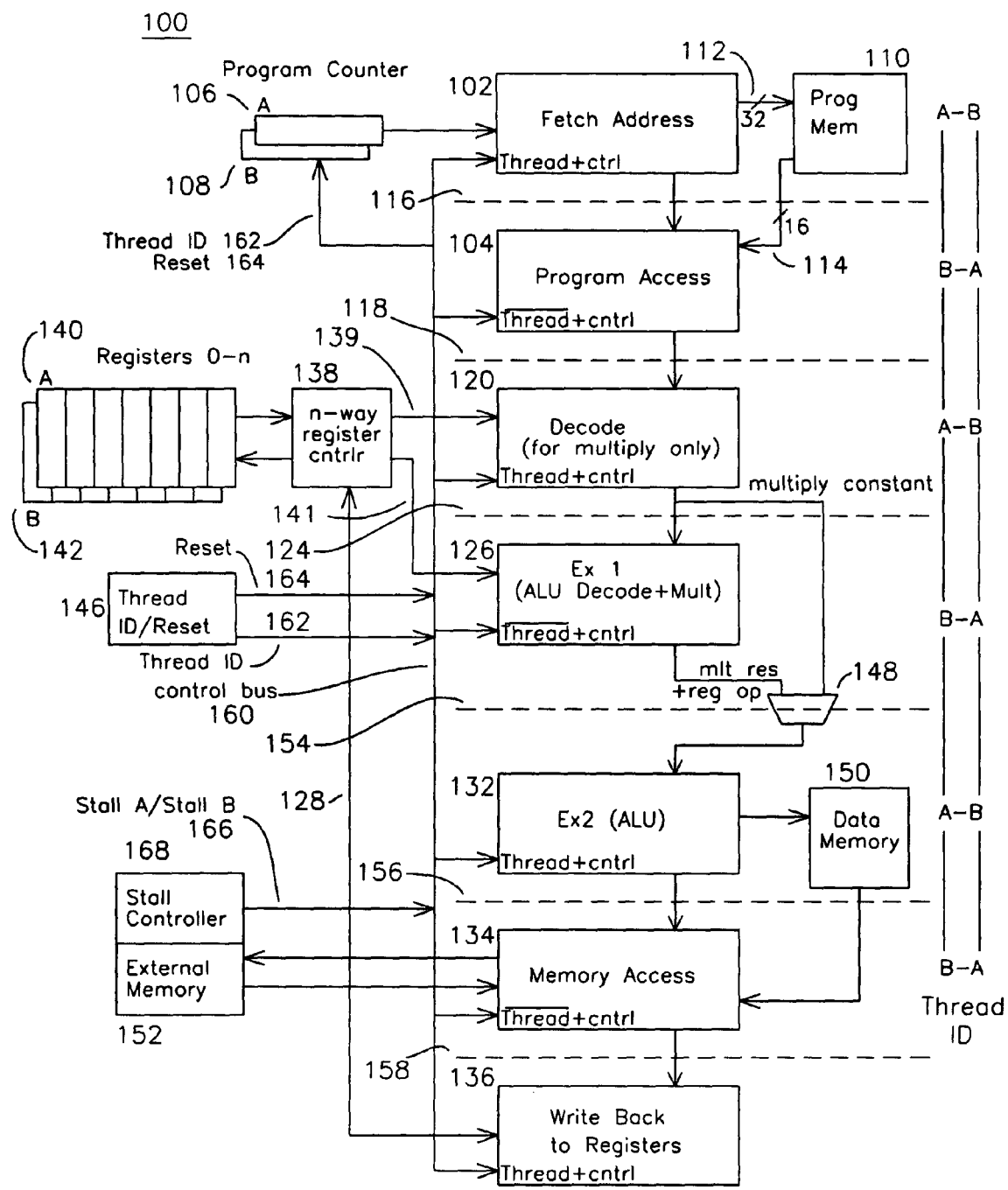
FIG. 2 shows the block diagram for a multi-thread processor having two threads.

FIG. 2 shows a Multiple Thread In-Order Issue In-Order Completion DSP and Micro-controller 100. While there can be as many different threads as desired, for the purpose of illustration two threads A and B are shown. A thread ID 162 is generated by a thread ID generator 146, which may also generate other control signals such as reset 164, which are shown on a shared control bus 160 which also carries other control signals as needed. In this manner, various stages of the Controller 100 act according to thread ID 162 available to them. For example, during Thread A, Fetch Address block 102 receives a Program Counter A 106 during the A Thread, and receives a different Program Counter B 108 during a second B thread. During an A thread cycle, the Fetch Address Stage 102 passes this A thread Program Counter address to the Program Memory 110, and the result is provided via a register (at dash line 116 boundary) to Program Access 104, which receives the data 114 associated with the Fetch Address 112. On the next B thread stage cycle, the Fetch Address Stage 102 receives a Program Counter B 108 and passes this address to the Program Memory 110. In this manner, one alternating set of Stages is successively processing A-B-A- threads, while the other stages intermixed between the alternating stages is processing B-A-B- threads. The stages of the controller 100 are separated by inter-stage registers, shown as dotted lines 116, 118, 124, 154, 156, and 158. The stages 102, 104, 120, 126, 132, 134, and 136 along with the inter-stage registers 116, 118, 124, 154, 156, and 158 form a micro-controller pipeline, where information from each stage is passed on to the next stage on each stage clock, and, except for stall conditions, each stage is performing operations on data within that stage and passing it on to the next. These stages are collectively known as the micro-controller core. Because the instructions are processed in sequence, the micro-controller 100 core is known as an in-order issue, in-order completion pipeline. This is only true within a particular thread, since the opposite thread may be in a stall condition, and the two threads execute independently of each other. The Program Access Stage 104 receives the executable code instructions 114 comprising instructions and immediate data, and passes them on to the Decode Stage 120, which decodes only multiply instructions, receiving register multiplication operands from register controller 138 on bus 139, and passes non-multiply instructions to EX1 126 for decode. Non-multiply opcodes are received by Decode 120 and passed to EX1 126 where the decode takes place, and if reading a register is required, this is done using register access bus 141. As a first example, a Load Immediate instruction comprises an opcode including a register destination and a data value to be loaded into this register destination. This load immediate instruction is passed by decode 120 to EX1 126, where non-multiply instructions are decoded. If the opcode were a load from register instruction, the decode would similarly be done in EX1 126, and register data would be delivered on bus 141 to EX1 stage 126. The Write Back stage 136 is responsible for moving results back to registers A 140 or B 142. If the Thread ID is A, then the data is written into one of the A memory registers 140, and if the Thread ID is B, the data is written into one of the B memory registers 142. The first execution stage EX1 126 acts directly on data from the decode stage 120 for multiply instructions, and multiplexer 148 advances multiply operand constants and register values from bus 139 from decode 120 to Second Execution Stage EX2 132 via multiplexer 148. EX2 stage contains the ALU and performs arithmetic operations such as ADD, SUB (subtract), ROL (rotate left), ROR (rotate right), and other instructions commonly known in the art of Arithmetic Logic Units (ALUs). Multiplexer 148 receives multiply results from EX1 126 and register values delivered from EX1 126 via register bus 141 accessing A register 140 or B register 142, depending on thread. For the case of a stall condition, there may be results of arithmetic operations stored in the EX2 ALU 132, which may be stored in a set of dedicated registers so that the non-stalled thread may continue passing results from the second execution stage EX2 132 to the memory access stage 134. Since there are two threads, and either thread may stall with computational results, there are two sets of result registers at the boundary of second execution stage 132 and memory access stage 134.

There are three types of data storage which are used by the processor 100. The first type of storage is Register Storage A 140 and B 142, which is very fast shared storage controlled by n-way register controller 138. The registers A 140 and B 142 are written or read simultaneously by a plurality of stages, including Decode Stage 120 for reading registers for multiply operations, First Execution Stage EX1 126 for reading register values for non-multiply operations, and Write Back Stage 136 for writing results back to registers. It is useful for the alternate stages in the pipeline path to have access to registers 140 as shown with stages 120, 126, and 136 having access to register controller 138 such that when the Thread ID is A, most of the register accesses are A thread registers, and when the Thread ID is B, most of the register access are B thread registers. An exception to this would be thread A having a multiply instruction in Decode 120 reading an A register 140 over bus 139 while a load from register instruction on the B thread was in EX1 stage reading a B register 142 over bus 141. However, most of the time, the register reads and writes tend to be on the same thread. The n-way register controller 138 allows A and B thread operations to occur simultaneously. This is important because the n-way register controller may receive simultaneously a request to write register 0 from decode Stage 120, and to read register 0 from Second Stage EX2 132, or there may be a request to write back a value in Write Back 136 while there is a request to read a value in EX2 132, and data coherency requires that all of these reads and writes be handled concurrently, which requires they all be on the same thread. The n-way register controller 138 in this case furnishes the data value directly to the reading stage from the writing stage, simultaneously writing the new value into the required register. The second type of storage memory is Data Memory 150, for which an address is provided by the ALU Second Execution unit EX2 134, and is available to the Memory Access Stage 134. The Register Storage 140 and 142 has the highest memory bandwidth, since it must be able to write and read multiple registers during a single stage cycle, while the Data Memory 150 is only able to read or write a single address during a single stage cycle. The External Memory 152 is potentially the slowest memory, since the processor 100 may be competing with other devices for this bandwidth over a shared bus. When slow external memory 152 is read, and the read lasts more than a single stage clock cycle, a "pipeline stall" condition occurs, and no data is moved through any of the stages described until the stall condition is removed. Often, in shared resource systems, a bus controller 164 controls stall signal 166 where the bus controller receives a "/REQUEST" signal indicating a request to start a transaction, and the bus controller replies with an "/ACKNOWLEDGE" signal indicating availability of the device to accept the data. For write cycles, it is possible for the controller to simply store successive data cycles in a fifo for dispatch over time when the memory device becomes available, as is known in the art as "write caching", which may prevent pipeline stall conditions. However, data read conditions often cause a stall during the interval between the /REQUEST of the bus controller 164 to read remote data and /ACKNOWLEDGE associated with availability of data by the remote device.

The Thread ID 162 indicates whether an A or B thread cycle is being executed, and it is also readable by the program so that a particular thread is able to determine whether it is running on the A or the B thread. A single instance of the program to execute may then be stored in Program Memory 110, and each separate instance of the program may read the thread ID to determine whether it is an A or a B thread. This is particularly useful in a wireless system with two communications channels by having each thread separately handle each wireless channel. There are several advantages of this approach. From the earlier description, it can be seen that a stall condition such as reading from external memory causes the entire processing sequence to halt. In a typical multi-threaded RTOS, the overhead of swapping context memory means that hundreds or thousands of instructions are executed before the overhead intensive context switch occurs. This is done infrequently to avoid "thrashing", where much of the processor time is spent changing contexts, and very little is spent handling actual processes. By switching threads on alternating cycles, two clear advantages are accrued. The first advantage is that by interleaving stages requiring register access through controller 138, the stages are able to instantaneously access register values and achieve data coherency and data consistency in these accesses. The second advantage is that the interleaving of cycles allows the computational results of a stage handling any given thread (A or B) to be simply passed on to the following stage on the following stage cycle without the requirement for each stage to keep thread context storage for each thread, thus reducing inter-stage storage requirements. By contrast, if all of the stages were simultaneously given the same context value (all stages 102, 104, 120, 126, 132, 134, 136 simultaneously processed thread A, followed by these same stages simultaneously processing thread B), the controller of FIG. 2 would also work satisfactorily and handle two threads independently, however the intermediate results for each stage would have to be placed in temporary thread context storage, and then retrieved for the following thread cycle. While the processing bandwidth would be the same as shown in FIG. 2, the inter-stage memory requirements would be significantly higher. It is therefore believed that alternating thread IDs across successive stages such that stages FA 102, Decode 120, EX2 132 and WB 136 are handling one thread ID while stages PA 104, EX1 126, and MA 134 are simultaneously handling the other thread ID is best mode as shown in FIG. 2.

Figure 1:
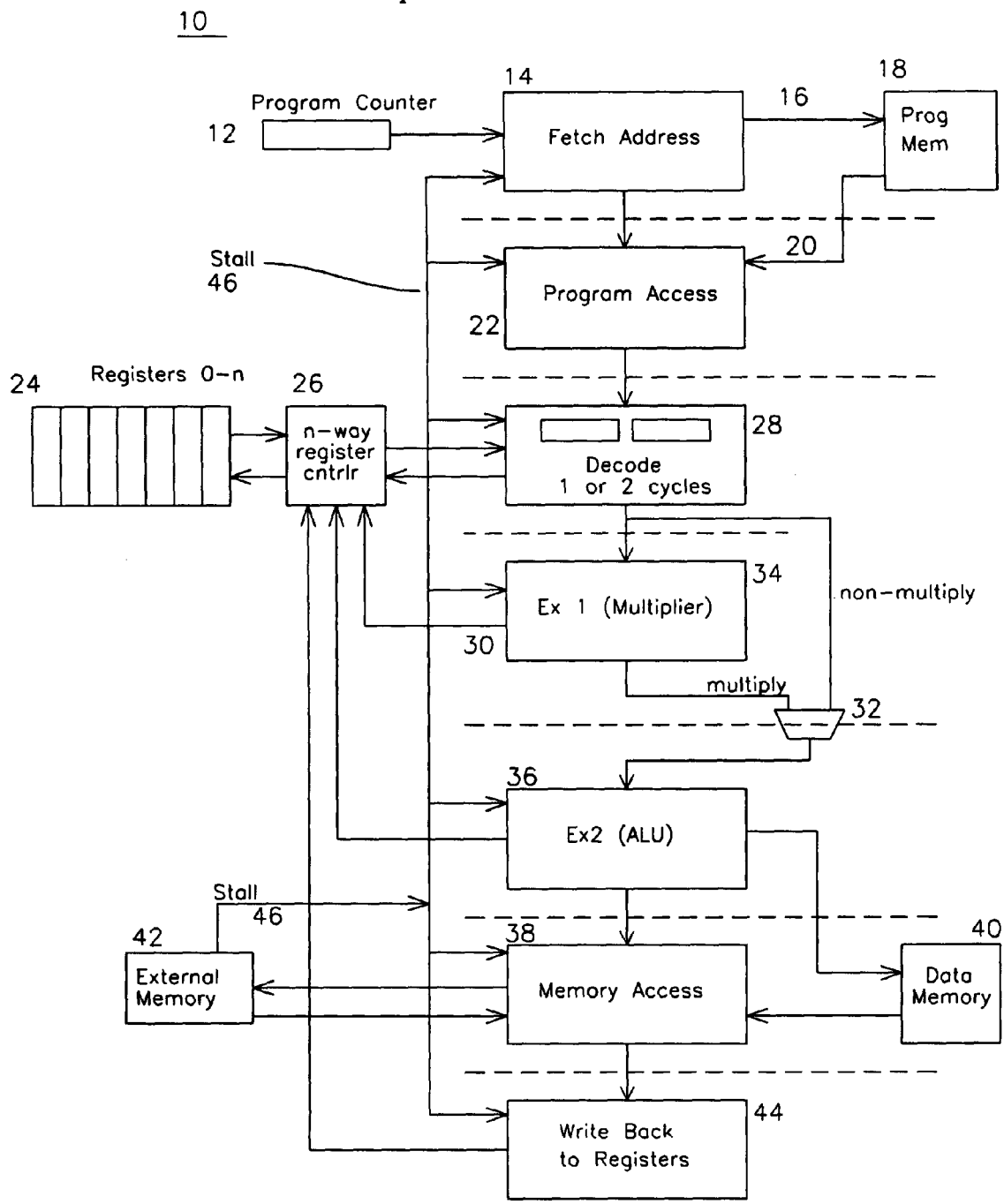
FIG. 1 shows the block diagram for a prior art processor.

The granularity of information moved from stage to stage is established by a stage clock (not shown) which controls the simultaneous transfer of information from stage to stage across inter-stage boundaries using registers 116, 118, 124, 154, 156, and 158 shown as dashed lines. These registers are synchronously clocked registers as known to one skilled in the art. The thread ID alternates values between A and B on successive stage clock cycles. When a stall condition occurs, the signals Stall A and Stall B 160 are distributed to each stage so they may suspend further processing of that particular thread until the stall condition is removed. The non-stalled thread continues to execute without interruption or reduction in performance, which is one of the principle advantages of the multi-threaded micro-controller. The requirement for the non-stalled thread to continue operation while the stalled thread waits for external memory 152 availability results in thread-specific storage at each stage boundary 116, 118, 124, 154, 156, 158, however the amount of thread information stored in stage registers is much smaller than the entire thread context as would be stored in the prior art of FIG. 1 with a multi-tasking operating system.

FIG. 3 shows an elapsed time view of the two threads, where a single instruction from each thread is shown passing through the various stages of the microcontroller. Thread A 200 represents the movement of a MUL (multiply) instruction 204 followed by an ADD instruction 208 passing through the micro-controller. In this view, the instructions are separated by thread as thread A 200 and thread B 202 for clarity, although it is understood that while the instructions are shown starting at the same time, the instructions shown in thread A and thread B are completely unrelated to each other in timing, and may be displaced many cycles from each other. The MUL instruction 204 passes through the FA, PA, DEC, EX1, EX2, MA, and WB stages, followed by the ADD instruction 208, which also passes through these same stages in sequence, as shown on Thread A 200. Thread B 202 shows a SUB (subtract) instruction 206 followed by a ROL (rotate left) instruction 210 passing through the same stages FA, PA, DEC, EX1, EX2, MA, WB in sequence. Each stage FA, PA, DEC, EX1, EX2, MA, WB is operating in succession on thread A and then thread B, and the two threads are fully asynchronous. As discussed earlier, a stall condition on thread A has no effect on the processing of instructions in thread B.

FIG. 4 shows a sequential set of instructions for thread A 216 and a set of sequential instructions for thread B 218, the first two of which were discussed in FIG. 3. In practice, the program memory 110 of FIG. 2 holds these instructions, which begin to execute on both threads A and B upon release of a reset signal, and the two threads may be executing the same program. At some point, each instance of the program may contain instructions which query the thread ID 146, and branch to one task if the thread ID is A, and branch to a different task if the thread ID is B. In this manner, a single program residing in program memory 110 may be used to execute multiple threads of a single program. The advantage of using multiple instances of the same program which are each examining thread ID 162 is that multiple instances of a single program require only a single stored version, reducing the size requirement of program memory 110.

FIG. 5 shows the progression of the set of instructions shown in FIG. 4 through the processor 100. The MUL, ADD, MOV, ROR instructions of FIG. 4 thread A are shown as they progress through the FA, PA, DEC, EX1, EX2, MA, and WB stages. Any single stage such as FA executes alternating thread A and thread B instructions, and each instruction progresses to the next stage.

Figure 6:
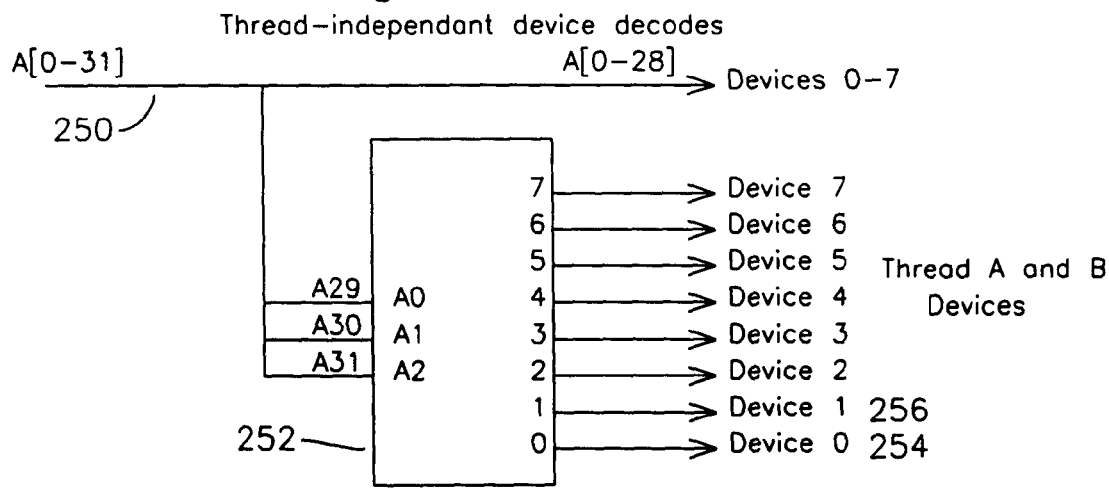
FIG. 6 shows a thread-independent device decoder for addressing thread-independent devices.

FIG. 6 shows an example of decoding a thread-independent memory access using only the top 3 bits of an address. A 32 bit address A0-A31 250 such as may be generated by Memory Access stage 134 of FIG. 2 is presented to external memory 152 of FIG. 2. The top 3 address bits A31-A29 are provided to the address input of a decoder 252, and for each combination of these 3 address bits, one of the device outputs 0-7 is asserted. For example, hex addresses in the range 0x00000000 to 0x1fffffff could cause a select for device 0 254 to be asserted, and addresses in the range 0x20000000 to 0x3fffffff could cause a select for device 1 256 to be asserted. Each memory mapped device controlled by this decoder such as a static memory device, etc would have its address lines tied to A0-A28 for all such devices, while each device would have one enable line tied to a device decode such as Device 0 254, Device 1 256, etc. Read/write lines for the device would be driven by control lines from memory access 134 as known to one skilled in the art. The decoder of FIG. 6 would be used for thread-independent devices, such that the read and write activities from thread A and thread B decode to the same device. This functionality is useful where the thread is interested in checking the status of a device, or where the threads use their own thread knowledge to separate addresses. For example, the program of thread A could use a range of memory exclusive of the program of thread B.

Figure 7:
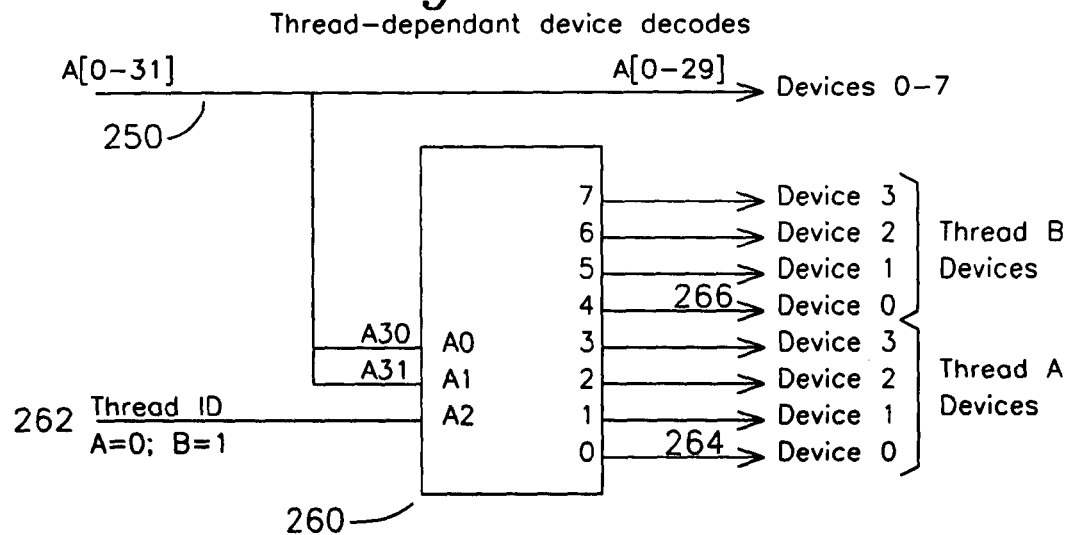
FIG. 7 shows a thread-dependent device decoder for addressing devices separated by thread ID.

FIG. 7 shows the case of a device decoder for thread-specific devices, where each device only responds to a particular thread. A 32 bit address A0-A31 250 such as may be generated by Memory Access stage 134 of FIG. 2 is presented to external memory 152 of FIG. 2. The top 2 address bits A31-A30 are provided to the address input of a decoder 260, and for each combination of these 2 address bits plus the thread ID bit 262, one of the device outputs 0-7 is asserted. For example, for Thread ID=A, hex addresses in the range 0x00000000 to 0x3fffffff could cause a select for thread A device 0 264 to be asserted, and addresses in the same range 0x00000000 to 0x3fffffff for thread ID=B could cause a select for thread B device 0 266 to be asserted. Each memory mapped device controlled by this decoder such as a static memory device, etc would have its address lines tied to A0-A29 for all such devices, while each device would have one enable line tied to a device decode such as thread A Device 0 264, thread B Device 0 266, etc. Read/write lines for the device would be driven by control lines from memory access 134 as known to one skilled in the art.

A memory map describes the mapping of addresses to devices. FIG. 6 described a way to perform thread-independent device decodes, where each device occupies a space in a memory map accessable by all threads, and FIG. 7 describes a way to perform thread-dependant device decodes, such that the memory map is described for a particular thread.

The sizes of the various addresses and data paths may vary greatly depending on the particular application, however, it may appear that for wireless applications and others, an address size of 32 bits and a data size of 16 bits provides good performance. While these sizes are not intended to limit the scope of the invention as set forth, an address size of 32 bits and data size of 16 bits would allow a set of 16 registers A 140 and B 142 to be used in pairs to form 32 bit address pointers for indirect addressing, as known to one skilled in the art. A 32 bit address would also imply that the decode stage 120 may get an indirect relative 16 bit address offset on a single cycle, or it may wait for a full 32 bit address on two cycles. For this reason, the decode stage is shown as one or two cycles. For two cycle operations, the following cycle is not a multiply operation, so the EX1 stage may be bypassed. In this manner, the execution length of the instruction may be preserved. This may require additional storage at the decode stage such that the full 32 bit address may be passed through the pipeline on the next same-thread operation.

Other registers duplicated on a per-thread basis and known to those skilled in the art of processor design are not shown for clarity. It is clear that these registers would also be duplicated for each thread, and could either be part of the registers A 140 and B 142, or Program Counters A 106 or B 108, or may be present in one of the associated stages. One such other register known to those skilled in the art is a Stack Pointer which is used for returning from subroutines to re-establish register state prior to the jump to subroutine. Another such register is a status register for keeping track of the result of arithmetic and multiplicative operations, as well as interrupt status. Another set of registers may be used for looping operations, and are known as a HWS register to store the program counter A 106 or B 108 during loop operations, an LA register for storing loop addresses, and LC register for keeping track of loop iterations. Each of these registers would be duplicated for A thread and B thread such that each thread has all of the resources required for a single thread, while using as much duplicated hardware as possible.

I claim:

1. A multi-thread processor for processing a plurality of threads comprising:
    operative stages including a Fetch Address Stage, a Program Access Stage, a Decode Stage, a First Execution Stage, a Second Execution Stage, and a Memory Access Stage;
    a Thread ID generator producing a thread identifier which alternates between a first and second value on successive even and odd clock cycles;
    a plurality of register sets, one said register set associated with each said thread value, each said register set comprising a plurality of registers;
    an n-way register set controller coupled to said plurality of register sets and simultaneously handling multiple read or write requests associated with one or more of said thread values;
    said Fetch Address Stage generating a Program Memory Address associated with said first thread identifier during said even clock cycles and said second thread identifier during said odd clock cycles;
    said Program Access Stage for receiving Program Memory Data associated with said Program Memory Addresses and forwarding said Program Memory Data and said Program Memory Addresses associated with a second thread during said even clock cycles and said Program Memory Data and said Program Memory Addresses associated with said first thread identifier during said odd clock cycles;
    said Decode Stage converting said Program Memory Data into instructions, said Decode Stage coupled to said n-way register set controller, said instructions associated with said first thread identifier forwarded during said even clock cycles and said instructions associated with said second thread identifier during said odd clock cycles;
    said First Execution Stage for handling a multiply class of instruction received from said Decode Stage and generating a multiply result associated with a second thread identifier during said even clock cycles and a multiply result associated with said first thread identifier during said odd clock cycles;
    said Second Execution Stage for handling an Arithmetic Logical Unit class of instructions received from said Decode Stage, said Second Execution Stage also coupled to said n-way register set controller, said Second Execution Stage generating a result associated with said first thread identifier during said even clock cycles and a result associated with said second thread identifier during said odd clock cycles;
    said Memory Access Stage for handling reading and writing of external memory, said Memory Access Stage optionally reading or writing data associated with said second thread identifier during said even clock cycles and data associated with said first thread identifier during said odd clock cycles;
    a Write Back Stage coupled to said n-way register set controller for writing data to said register set;
    said n-way register controller allowing simultaneous access to said plurality of register sets by at least two of said Decode Stage, said First Execution Stage, and said Write Back Stage;
    where:
        said result from said Fetch Address Stage associated with each said thread identifier is coupled to said Program Access Stage on a subsequent cycle;
        said result from said Program Access stage associated with each said thread identifier is coupled to said Decode Stage on a subsequent cycle;
        said result from said Decide Stage associated with each said thread identifier is coupled to said First Execution Stage on a subsequent cycle;
        said result from said First Execution Stage associated with each said thread identifier is coupled to said Second Execution Stage on a subsequent cycle;
        said result from said Second Execution Stage associated with each said thread identifier is coupled to said Memory Access stage on a subsequent cycle;
    such that said result for each stage associated with a first thread are delivered to a subsequent stage operative on said first thread in a subsequent cycle, and results for each stage associated with a second thread are delivered to a subsequent stage operative on said second thread on a subsequent cycle.

2. The processor of claim 1 where a pipeline core is formed by stages in succession: said Fetch Address stage, said Program Access stage, said Decode stage said First Execution stage, said Second Execution stage, said Memory Access stage, and said Write Back stage.

3. The processor of claim 1 where said n-way register set controller simultaneously receives at least one of read requests from said Decode stage, read and write requests from said Second Execution stage, or write requests from said Write Back stage.

4. The processor of claim 1 where said Memory Access stage is coupled to a memory controller.

5. The processor of claim 4 where said memory controller issues a stall signal when receiving a memory request to an external memory.

6. The processor of claim 4 where said memory controller issues a stall signal when receiving a memory read request to an external memory.

7. The processor of claim 4 where said memory controller issues a stall signal which lasts an interval from receiving a memory read request to receiving requested data form said external memory.

8. The processor of claim 2 where two threads are concurrently processed and said pipeline core comprises a subset of said stages operative on one said thread and remaining said stages operative on said other thread.

9. The processor of claim 1 where said first execution stage performs multiply operations and said second execution stage performs non-multiply instructions.

10. The processor of claim 1 where said decode stage forwards non-multiply operands to said second execution stage.

11. The processor of claim 1 where program memory contains a single instance of a program, and said thread identifier can be read by said program.

12. The processor of claim 1 where said thread identifier can be read by each said thread.

13. The processor of claim 1 where each said thread reads said thread identifier to perform thread operations which are independent.

14. The processor of claim 1 where thread identifier is used along with an address to enable a device in a memory map.

15. The processor of claim 1 where devices are enabled in a memory map based on address only.

16. The processor of claim 1 where said Decode stage performs decoding of instructions for said multiply class of instruction, and said First Execution stage performs decoding of instructions for said arithmetic logical unit class of instructions.

17. The processor of claim 16 where if one of said multiply class of instructions requires a register operand, said operand is provided from said registers to said decode stage, which performs said multiply.

18. The processor of claim 16 where if one of said arithmetic logical unit class of instructions requires a register operand, said operand is provided from said registers to said first execution stage.

19. The processor of claim 1 where at least one said stage includes an operational clock which is at a higher rate than said stage clock.

20. A multi-threaded processor comprising a first through seventh stage, each stage responsive to a stage clock for passing results produced by a particular stage to a next stage such that said results are associated with a first thread identifier or a second thread identifier;

said first stage receiving program counter address information from a unique program counter associated with each said thread identifier and delivering said address to a program memory;

said second stage for receiving program data from a program memory;

said third stage for performing decode of said program data;

said fourth stage for performing multiplication operations or decode operations;

said fifth stage for performing non-multiplication operations;

said sixth stage for accessing external memory;

said seventh stage for writing results of computations performed in said fourth stage or said fifth stage back to a register set;

said register set being duplicated for each said thread identifier;

said register set allowing simultaneous access by at least two of said third stage, said fourth stage, and said seventh stage;

each said first through seventh stage receiving said thread identifier and operating according to a first or second value;

said first stage, said third stage, and said fifth stage generating results during a current said stage clock cycle and, during a subsequent stage clock cycle, transferring said results to said second stage, said fourth stage, and said sixth stage, respectively;

said second stage, said fourth stage, and said sixth stage generating results during said current said stage clock cycle and, during a subsequent said stage clock cycle, transferring said results to said third stage, said fifth stage, and said seventh stage, respectively.

21. The multi-threaded processor of claim 20 where said first, third, fifth and seventh stages use one value for said thread identifier, and said second, fourth, and sixth stages use a different value for said thread identifier.

22. The multi-threaded processor of claim 20 where said threads each control execution of a program, and said programs execute independently of each other.

23. The multi-threaded processor of claim 22 where one solid thread may stop execution and the other said thread continues execution.

24. The multi-threaded processor of claim 20 where said registers and said stages contain data which is used separately for each said thread identifier.

25. The multi-threaded processor of claim 20 where said stages alternate between two threads on each said stage clock.

26. The multi-threaded processor of claim 20 where said thread identifier identifies a register set and a program counter.

27. The multi-threaded processor of claim 20 where said third stage performs said decode for multiply operations.

28. The multi-threaded processor of claim 20 where said fourth stage performs said decode for non-multiply operations.

29. The multi-threaded processor of claim 28 where said fourth stage performs said multiply operations.

30. The multi-thread processor of claim 28 where said fifth stage performs said non-multiply operations.

31. The multi-thread processor of claim 28 where said non-multiply operations include at least one of rotate, shift, add, subtract, or load.

32. The multi-thread processor of claim 29 where said multiply operations include multiplication by a constant from one of said registers.

33. The multi-thread processor of claim 30 where said non-multiply operations include addition of a multiply result from said fourth stage.

34. The multi-thread processor of claim 20 where said thread identifier includes a plurality of values, each said value having at least one register and a program counter.

35. The multi-thread processor of claim 20 where said sixth stage said external memory responds in more than one said stage clock cycle.

36. The multi-thread processor of claim 20 where said external memory generates a stall signal for each said thread identifier, thereby causing all said stages to store and maintain data for that thread identifier until said stall signal is removed by said external memory.

37. The multi-thread processor of claim 20 where said fifth stage generates an address for a data memory.

38. The multi-thread processor of claim 37 where said sixth stage receives and generates data for said data memory.

39. The multi-thread processor of claim 20 where said thread information storage includes registers which store results from said fifth stage for each said thread identifier.

40. The multi-thread processor of claim 20 where said registers which store results from said fifth stage allow a non-stalled thread to continue execution without modifying said stored results.

* * * * *

UNITED STATES PATENT AND TRADEMARK OFFICE
CERTIFICATE OF CORRECTION

| | | |
|---|---|---|
| PATENT NO. | : 7,761,688 B1 | |
| APPLICATION NO. | : 11/899557 | |
| DATED | : July 20, 2010 | |
| INVENTOR(S) | : Heonchul Park | |

It is certified that error appears in the above-identified patent and that said Letters Patent is hereby corrected as shown below:

Column 5, line 62-63 "the new value into the required register" should be changed to --the new value into the requested register--

Claim 1, column 10, line 28 "said result from said Decide Stage" should be changed to --said result from said Decode Stage--

Signed and Sealed this

Thirteenth Day of September, 2011

David J. Kappos
*Director of the United States Patent and Trademark Office*